United States Patent [19]

Geohegan, Jr.

[11] 4,131,874

[45] Dec. 26, 1978

[54] INERTIAL BALANCED DIPOLE HYDROPHONE

[75] Inventor: Kenneth P. Geohegan, Jr., Catonsville, Md.

[73] Assignee: Westinghouse Electric Corp., Pittsburgh, Pa.

[21] Appl. No.: 796,243

[22] Filed: May 12, 1977

[51] Int. Cl.[2] .............................................. H04B 13/00

[52] U.S. Cl. ....................................... 340/10; 310/337; 340/13 R

[58] Field of Search .................... 340/8 R, 9, 10, 12 R, 340/13, 14; 310/330, 337, 351, 329, 331, 334

[56] References Cited

U.S. PATENT DOCUMENTS

| | | | |
|---|---|---|---|
| 2,842,685 | 7/1958 | Petermann et al. | 340/10 X |
| 3,230,503 | 1/1966 | Elliot, Jr. et al. | 340/10 |
| 3,331,970 | 7/1965 | Dundon et al. | 340/10 X |
| 3,437,171 | 4/1969 | Davis et al. | 340/10 |
| 3,560,914 | 2/1971 | Webb | 340/10 |
| 3,708,702 | 1/1973 | Brunnert | 340/10 |
| 3,879,726 | 4/1975 | Sweeny | 340/10 X |
| 3,965,455 | 6/1976 | Hurwitz | 340/8 R |

*Primary Examiner*—Harold J. Tudor
*Attorney, Agent, or Firm*—D. Schron

[57] ABSTRACT

A dipole hydrophone which includes a piezoelectric bender bar having at the ends thereof two identical disks having high added mass and low actual mass, and a single mass at the center with low added mass and high actual mass. Support wires are connected to the unit at the bender nodes so that movement of the support causes no electrical output. Another configuration includes a piezoelectric bender disk having an annular ring near the edge portion thereof and a single mass at the center of the disk with the ring and central mass having the same relationship as the disk and central mass of the other embodiment.

20 Claims, 20 Drawing Figures

INERTIAL BALANCED DIPOLE HYDROPHONE

BACKGROUND OF THE INVENTION

1. Field of the Invention

The invention in general relates to hydrophones, and in particular to a low frequency dipole hydrophone which is inertia balanced.

2. Description of the Prior Art

Dipole hydrophones are used in the underwater environment for listening to very low frequency noise as may be produced by a submarine, for example.

The dipole hydrophone is positioned at some point in the water, either alone or as part of an array, and provides an output signal in response to received acoustic energy, in accordance with its beam pattern, in the form of a figure 8.

Most dipole hydrophones respond directly to particle velocity and any mechanical vibration acceleration from the support structure may tend to provide an unwanted output signal.

In copending application Ser. No. 352,820, filed Apr. 19, 1973, and assigned to the same assignee as the present invention, there is described an acceleration cancelling hydrophone which utilizes two masses having different ratios of actual mass to added mass with each being connected by means of a multilaminar magnetostrictive arm to a base member with the unit including first and second pickups for providing an output signal.

The present invention eliminates the need for two matched multilaminar arms, and eliminates the requirement of two matched pickup units.

SUMMARY OF THE INVENTION

Instead of dual matched multilaminar magnetostrictive arms, the present invention utilizes a single piezoelectric bender unit. At least first and second masses are affixed to the bender unit at spaced apart locations with a node of the bender unit positioned between them. Means are provided for supporting the bender unit at nodal points. The first and second masses have respective sizes, shapes and mass that the acceleration of the masses are different in response to the same acoustic signal but are the same in response to physical movement of the support means, such that the output signal due to support motion is substantially zero.

DESCRIPTION OF THE PREFERRED EMBODIMENTS

Figure 1:
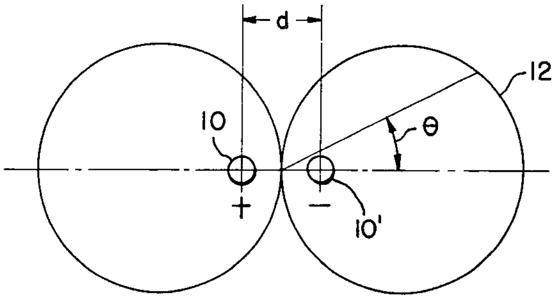
FIG. 1 illustrates the directivity pattern of a dipole hydrophone.

Referring now to FIG. 1, the dipole hydrophone, also known as a doublet transducer, may be represented by two small closely spaced transducers indicated by points 10 and 10', having opposite polarity. The signals from these two points cancel for equal pressure, thus any net response is due to a pressure gradient across the dipole. If points 10 and 10' are small with respect to the operating wavelength, and if the distance d between them is also small in comparison with the wavelength, for example, less than $1/10\ \lambda$, the directivity pattern will be the figure 8 pattern, 12, also known as a cosine directivity pattern wherein the response is proportional to the cosine of the angle $\theta$.

Figure 2:
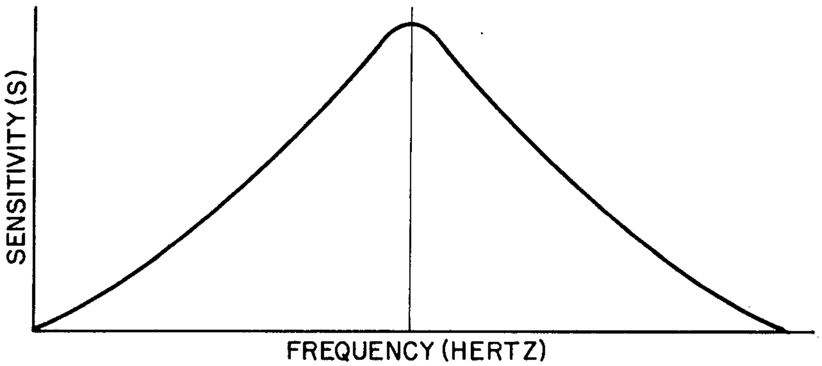
FIG. 2 illustrates a curve of sensitivity versus frequency for the dipole hydrophone of the present invention.

The present invention operates as a dipole hydrophone and is constructed and arranged to provide a frequency response when plotted on logarithmic scales such as illustrated in FIG. 2 wherein the vertical axis represents sensitivity (S) generally given in terms of output voltage relative to free field acoustic pressure, and wherein the horizontal axis represents frequency, in Hertz.

Figure 3:
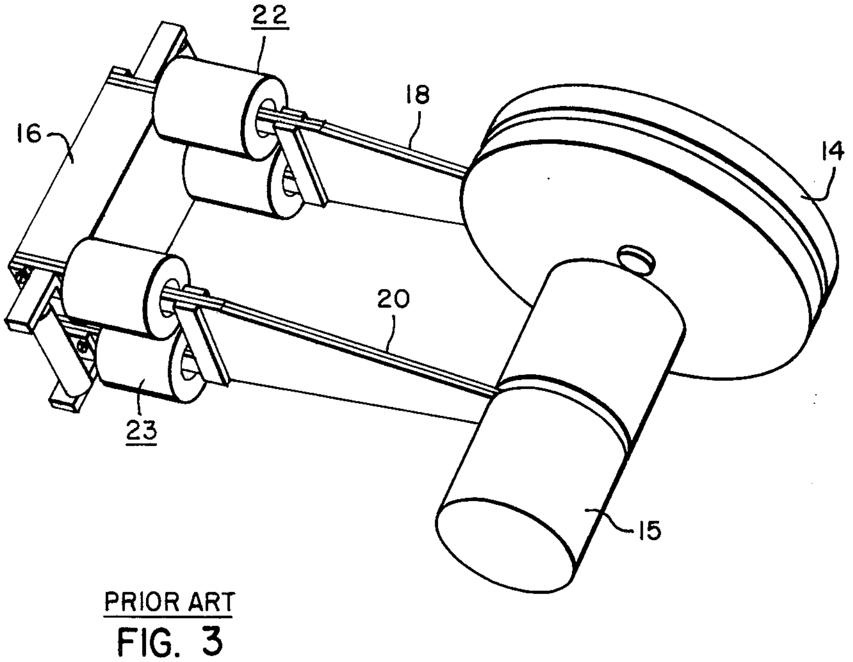
PRIOR ART FIG. 3
FIG. 3 illustrates the previously mentioned prior art acceleration cancelling hydrophone.

FIG. 3 illustrates a prior art acceleration cancelling hydrophone as described in application Ser. No. 352,820. The hydrophone of FIG. 3 includes first and second masses 14 and 15 connected to a base member 16 by means of respective multilaminar magnetostrictive arms 18 and 20. Electrical pickup units 22 and 23 are positioned around the base of arms 18 and 20 to provide transducer output signals. Although the static or in-air masses of members 14 and 15 are different, their in-water dynamic masses are substantially equal with the arrangement being such that when the unit is moved, both masses will cause respective output signals from units 22 and 23 of equal magnitude but of opposite phase so as to cancel one another. Member 14, however, will respond more to an acoustic signal so that the pickup unit will provide an output signal indicative thereof. The present invention utilizes at least two masses in an arrangement which eliminates the requirement for two multilaminar matched arms and two matched pickup units.

Figure 4:
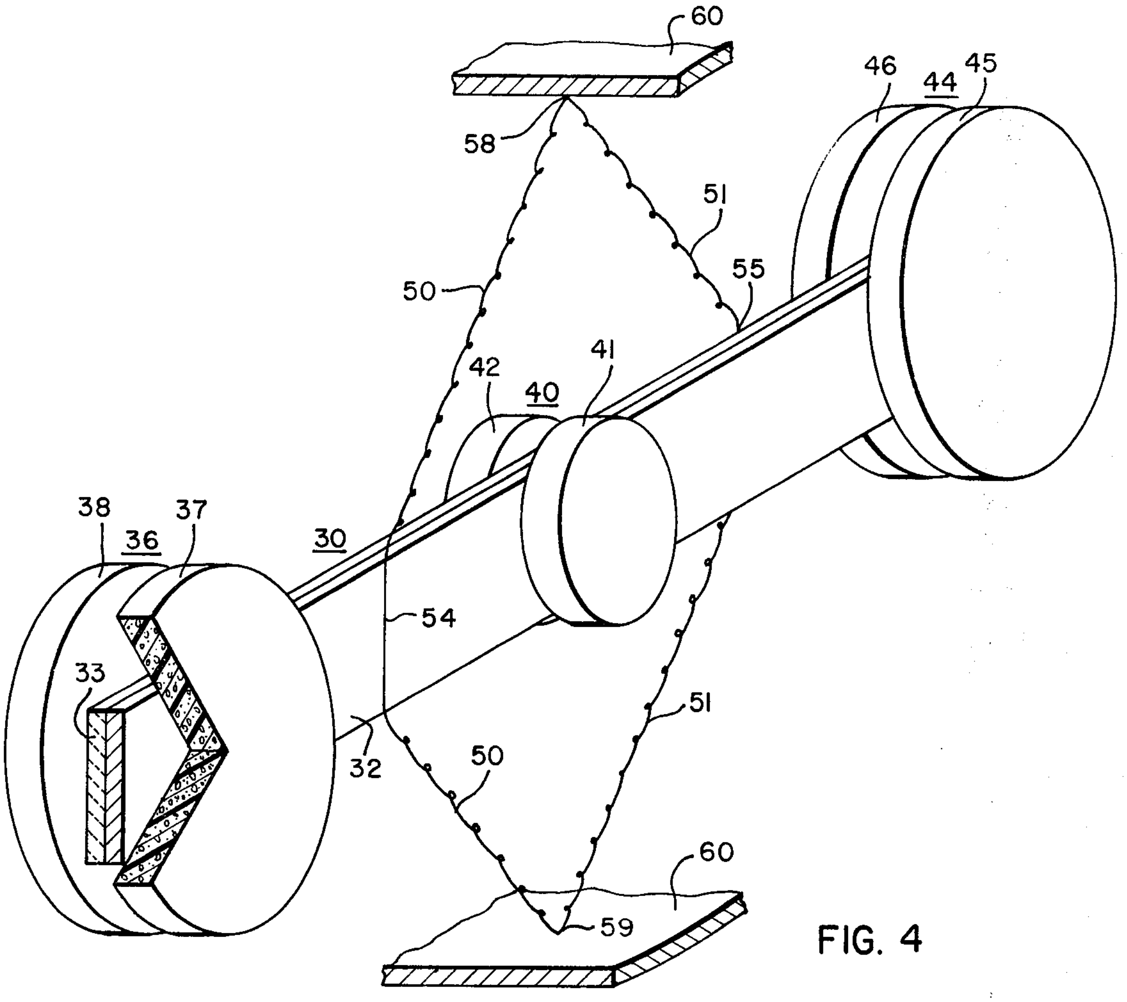
FIG. 4 is an isometric view of one embodiment of the present invention.

One embodiment of the present invention is illustrated in FIG. 4 and is seen to include an elongated piezoelectric bender unit 30 which is of a laminated construction, bilaminar being illustrated, and including a backing member 32 such as aluminum, by way of example, and a piezoelectric member 33 having a suitably electroded surface. The term piezoelectric is used loosely herein to include not only piezoelectric materials but electrostrictive materials as well, such as barium titanate and lead zirconate titanate (PZT).

First and second masses 36 and 40 are connected to the bender unit 30 at spaced apart locations with each mass being generally paddle-shaped. A convenient shape chosen is in the form of a disk, with mass 36 preferably being divided into two sections 37 and 38 straddling the bender unit 30, and mass 40 being divided into two sections 41 and 42 also straddling the bender unit with the sections being affixed to the bender unit by way of epoxy glue, by way of example.

The embodiment of FIG. 4 additionally includes a third mass 44 having first and second sections 45 and 46 and being similar to, and spaced an equal distance from mass 40, as is first mass 36.

The disk arrangements 36 and 44 on the ends are fabricated from a lower density material than the disk arrangement 40 in the center of the bender unit so that they have an actual mass that is smaller than the mass of sections 41 and 42. Due to their relatively bigger size, however, masses 36 and 44 have a relatively higher added mass (or water mass).

Wires 50 and 51 are utilized to support the bender unit 30 at spaced apart nodal points 54 and 55, 54 illustrated as being on the aluminum side of the bender unit, and 55 illustrated as being on the piezoelectric side of the bender unit. In a preferred embodiment, these supporting wires 50 and 51 also make electrical connection with the aluminum and piezoelectric so as to form the electrical leads of the transducer. The support leads or wires 50 and 51 are connected to points of attachment 58 and 59 of a housing member 60, a portion thereof being shown.

In order to reduce the strain on the supporting wires 50 and 51, in addition to reducing coupling forces, it is preferable that the transducer unit be neutrally buoyant. With the central mass 40 being a high actual mass, such as lead or brass by way of example, masses 36 and 44 may be constructed of a lightweight positively buoyant material, such as syntactic foam, which is a hardened resin binder with hollow microspheres and is a commercially available well-known item.

Figure 5:
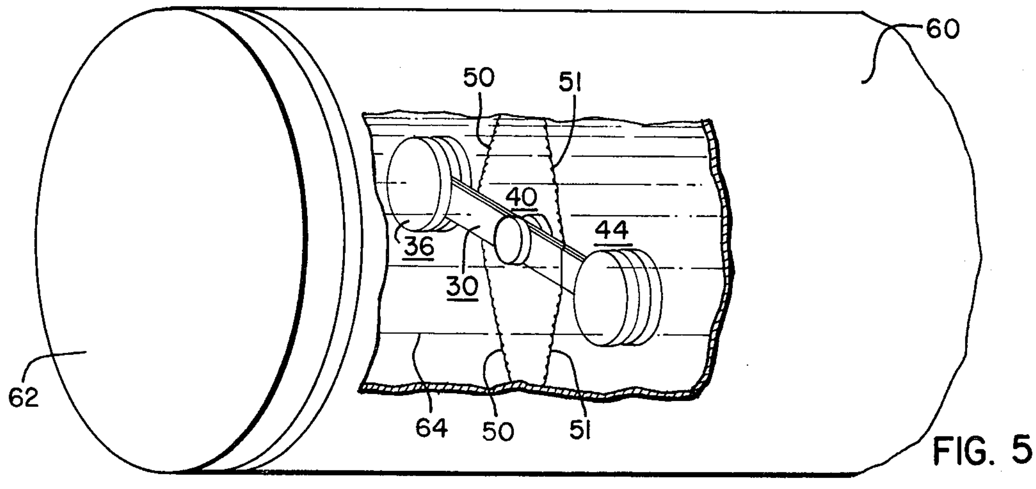
FIG. 5 is a partial view of a housing, with a portion broken away, illustrating the positioning of the hydrophone of FIG. 4.

In FIG. 5 a portion of the housing 60 is illustrated and by way of example is in the form of a tube having a membrane 62 for transmitting acoustic pressures and particle motions with little distortion to the interior thereof which is filled with a fluid 64 having similar acoustic characteristics as the ambient water, castor oil being one example.

The motion of a body in a fluid into which a sound wave is propagated, (the wavelength being large compared with dimension of the body), can be described by the following relationship:

$$\frac{\dot{U}}{\dot{V}} = \frac{M_W + m}{M + m}$$

where $\dot{U}$ is the velocity of the mass, $\dot{V}$ is the velocity of the water particles adjacent the mass, M is the mass of the body, $M_W$ is the mass of the water displaced by the body, m is the added mass.

The above relationship holds true not only for the first mass but also for the second mass, and in the present invention the first and second masses are of respective sizes, masses and shapes such that the acceleration of the first mass in response to an acoustic signal is different than the acceleration of the second mass in response to that same signal. With unequal responses ($\dot{U}/\dot{V}$ for one mass is different than $\dot{U}/\dot{V}$ for the other mass) deflection of the bender unit will be insured and an output signal indicative of the acoustic signal will be provided thereby.

Figure 6:
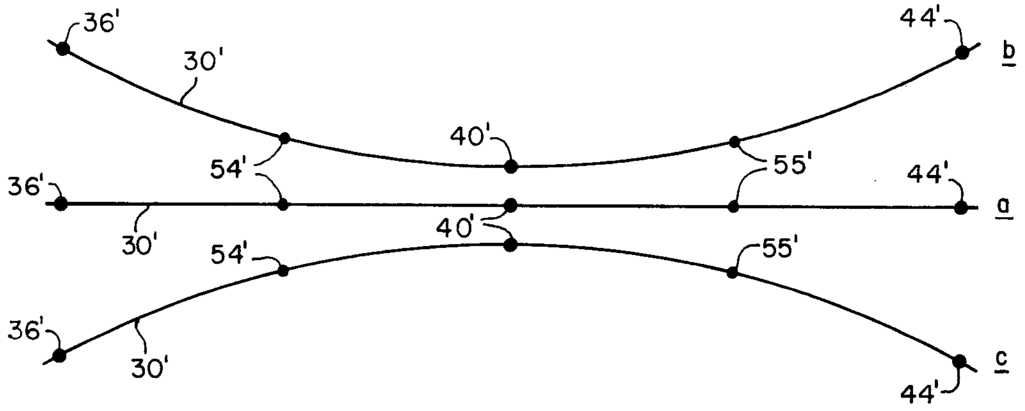
FIG. 6 serves to illustrate the bending of the piezoelectric element of the hydrophone in response to an acoustic signal.
Figure 7:
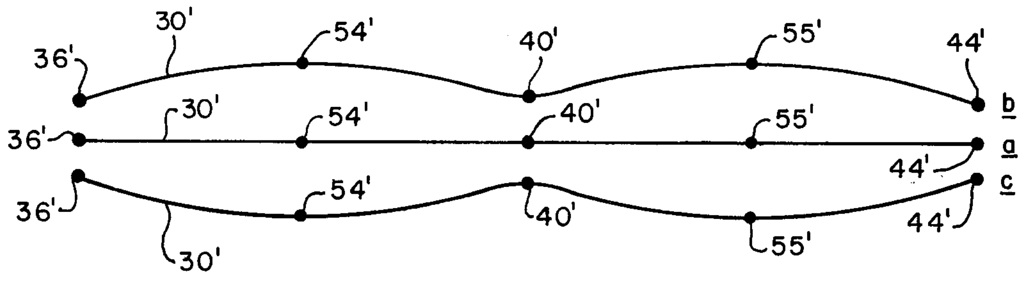
FIG. 7 illustrates the bending of the piezoelectric element of a hydrophone in response to movement of the support.

FIGS. 6 and 7 illustrate the mode of operation of the hydrophone unit of FIG. 4. In FIG. 6, position a represents the bender unit in its rest position as viewed from above, for example from attachment point 58. Bender unit 30 is represented by line 30′ while masses 36, 40 and 44 are represented by respective dots 36′, 40′ and 44′ corresponding to their centers of mass.

When an acoustic wave is received and transmitted through the transducer fluid to the hydrophone unit, the bender unit and mass combination will flex between positions b and c, shown greatly exaggerated for clarity. When assuming the position at b, one surface of the piezoelectric material, the one touching the aluminum backing is in tension while the opposite surface is in compression, thus providing a positive output signal. On the reverse cycle, as in position c, the piezoelectric surface in contact with the backing will be in compression while the opposite surface will be in tension, thus providing a negative output signal. The flexing of the bender unit will thus provide a positive and negative ouput signal in response to positive and negative variations of the pressure gradient of the input signal. If, however, the hydrophone unit is accelerated as by movement of its housing, an unwanted output signal is not provided with the present arrangement, and this may be illustrated with respect to FIG. 7.

When the housing member is moved, this movement is translated to the hydrophone unit by means of the supporting wires to nodal points 54 and 55. If the housing 60 (FIG. 5) is oscillated to the left and right, the bender unit will flex between the shapes as illustrated at positions b and c of FIG. 7. That is, the nodal points 54′ and 55′ are moved away from their rest position at a, but are moved a greater distance than are masses 36′, 40′ and 44′. The particular undulating shape of the piezoelectric means that the surface touching the backing member is in compression as much as it is in tension, as is the opposite surface, thereby resulting in no net output signal. Thus, the hydrophone unit is responsive to acoustic signals to provide an output signal indicative thereof and is non-responsive to any mechanical movement of its support or housing member, and thus the signal provided by the hydrophone is indicative only of the low frequency noise for which it is designed to detect.

Figure 8:
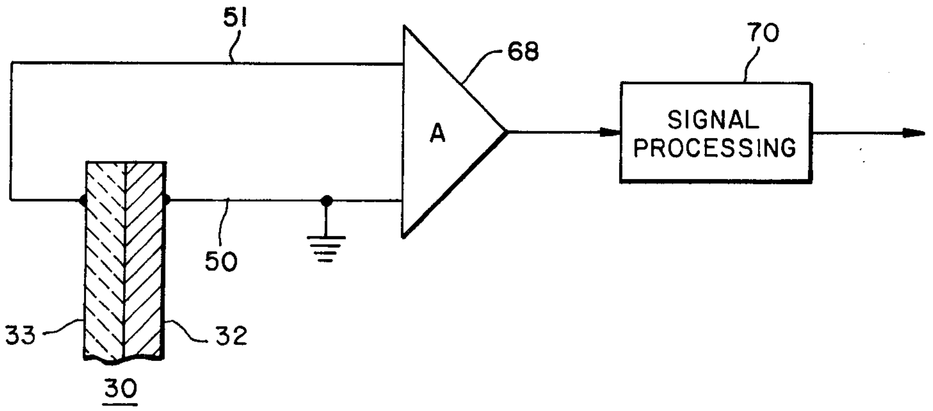
FIG. 8 illustrates the electrical connections to a bilaminar piezoelectric unit.

FIG. 8 illustrates a cross-sectional view through the bender unit 30 and shows the electrical connections of wire leads 50 and 51 to an amplifying means 68, the output of which is provided to a signal processing network 70. The amplifier and signal processing network may be located at the hydrophone site, or as is commonly done, may be located at a remote position, such as on a buoy or surface vessel.

Figure 9:
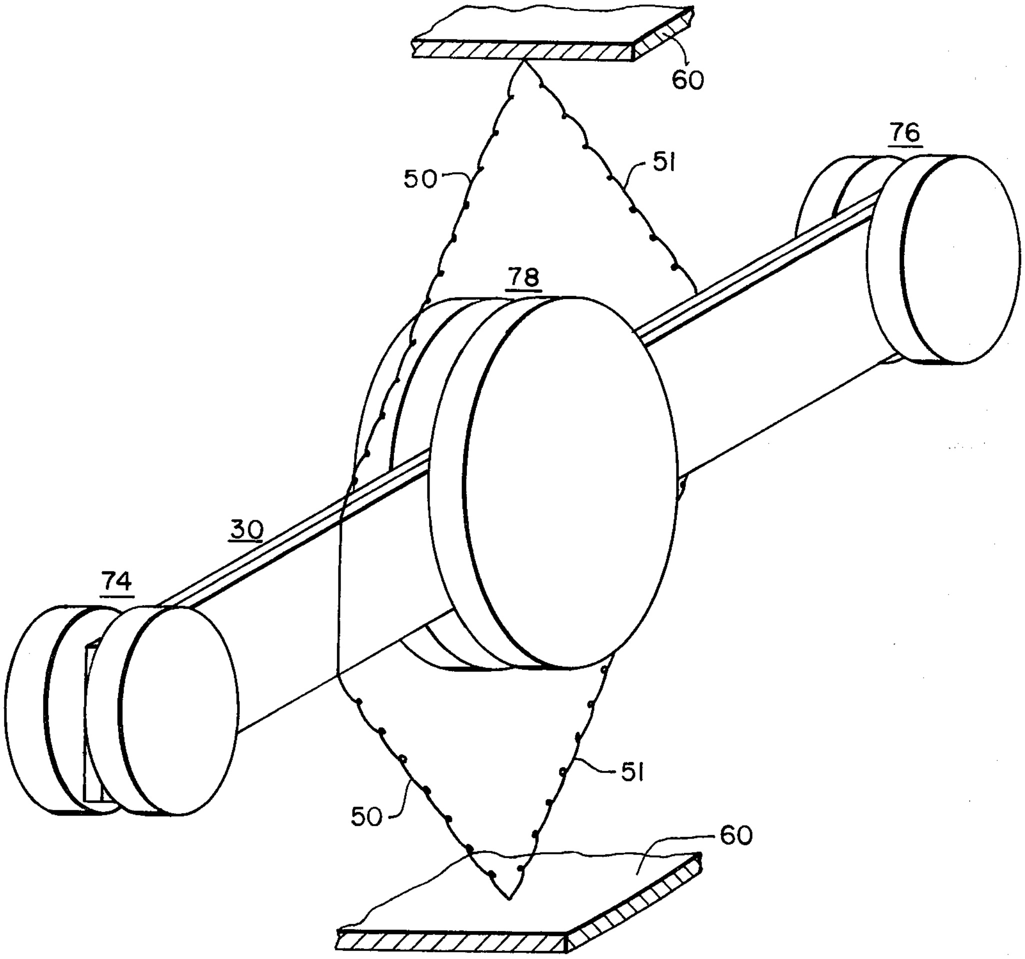
FIG. 9 illustrates an alternate arrangement of parts of the embodiment of FIG. 4.

FIG. 9 illustrates a hydrophone similar to that of FIG. 4, however, with a reversal of parts. In the embodiment of FIG. 9, the end masses 74 and 76 are of a construction similar to mass 40 of FIG. 4 whereas the central mass 78 is of a construction similar to the end masses 36 and 44 of FIG. 4 and the curvature of the bender unit 30 during operation can be described with respect to FIG. 6 by interchanging positions b and c.

Figure 11:
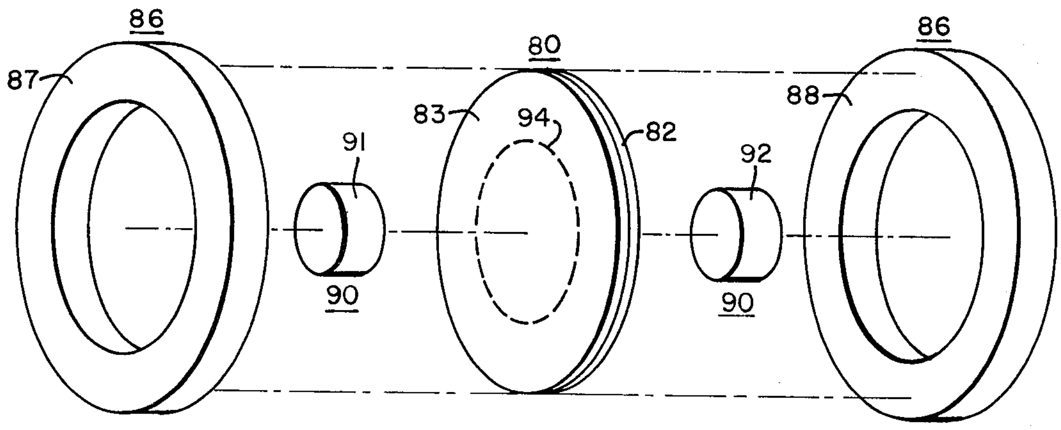
FIG. 11 is an exploded view of the hydrophone of FIG. 10.
Figure 10:
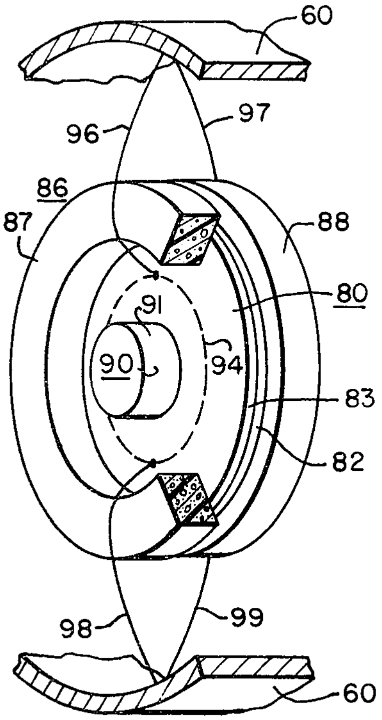
FIG. 10 is an isometric view, with a portion broken away, of an alternate embodiment of the present invention.

FIG. 10 illustrates another embodiment of the present invention wherein the bender unit is in the form of a bender disk 80 which includes a backing disk 82, such as aluminum, and a piezoelectric disk 83. A first mass 86 in the form of an annular ring is disposed around the outer surface of disk 80 and is preferably formed in two sections 87 on one side of the disk and 88 on the other side of the disk. A second mass 90 is disposed at the center of the bender disk and, as additionally illustrated in FIG. 11, is in two sections 91 and 92.

The first and second masses 86 and 90 are mounted relative to the bender disk 80 such that nodal circle 94 lies between them. Connected to this nodal circle 94 is a plurality of support wires 96–99 for supporting the unit relative to the housing 60. As was the case with respect to FIG. 4, two of the support wires such as 96 and 97 may also function as electrical leads.

Figure 12:
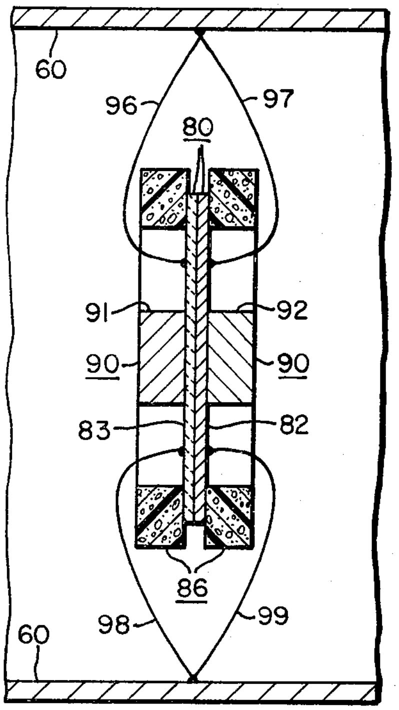
FIG. 12 is a side view of the hydrophone of FIG. 10.

The materials for fabricating the masses may be, if desired, the same as the embodiment of FIG. 4 in that the annular rings 87 and 88 may be of syntactic foam, while the center sections 91 and 92 may be of brass. The unit, like that of FIG. 4, is preferably designed with enough syntactic foam so as to make the unit neutrally buoyant. FIG. 12 additionally shows a cross-section through the device of FIG. 10 as mounted in a low distortion supporting housing which may be identical to the tube 60 of FIG. 5.

Figure 13:
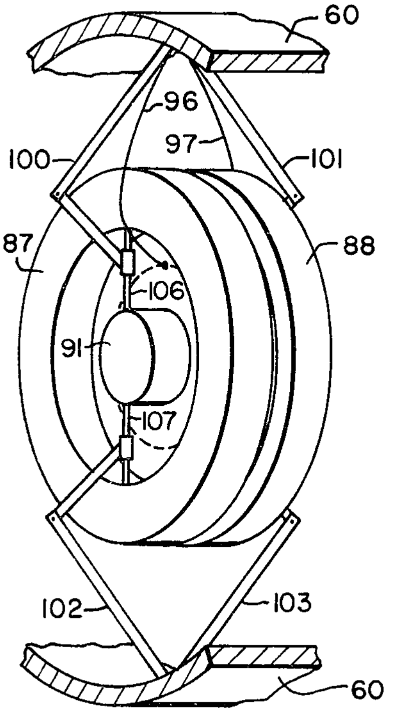
FIG. 13 illustrates an alternate support arrangement for the hydrophone of FIG. 10.
Figure 14:
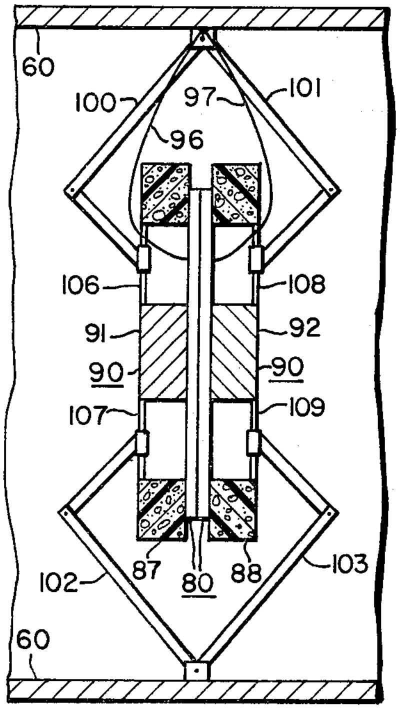
FIG. 14 is a side view of the arrangement illustrated in FIG. 13.

FIGS. 13 and 14 illustrate an alternate mounting arrangement for the device of FIG. 10, FIG. 13 illustrating an isometric view, and FIG. 14 illustrating an axial cross-section. Whereas in FIG. 10, the unit was supported by means of wires 96–99, the arrangement of FIGS. 13 and 14 includes a separate support structure.

The support structure includes an upper arm arrangement 100, 101, and a lower arm arrangement 102, 103. A series of wires 106–109 straddle the gap between the outer mass section and the inner mass section, and arms 100–103 are respectively connected to wires 106–109 nominally at a position which is level with the nodal circle. The arms, however, are adjustable relative to the wires so that further adjustments may be made to achieve zero electrical output due to motion of the tube 60. Thus, having the hydrophone mounted for motion compensation, electrical leads 96 and 97 may be connected to opposite sides of the bender disk 80 at any desired positions.

The bending of the bender disk 80 during operation may be described with respect to FIGS. 6 and 7 where the lines at positions a, b and c therein represent an axial cross-section through the bender disk and wherein mass 40′ would be equivalent to mass 90 and masses 36′ and 44′ would be equivalent to mass 86. Nodal points 54′ and 55′ therefore represent the nodal circle 94. As was the case with the embodiment of FIG. 4, the embodiments of FIGS. 10 and 13 may also have the light and heavy masses interchanged.

Figure 15:
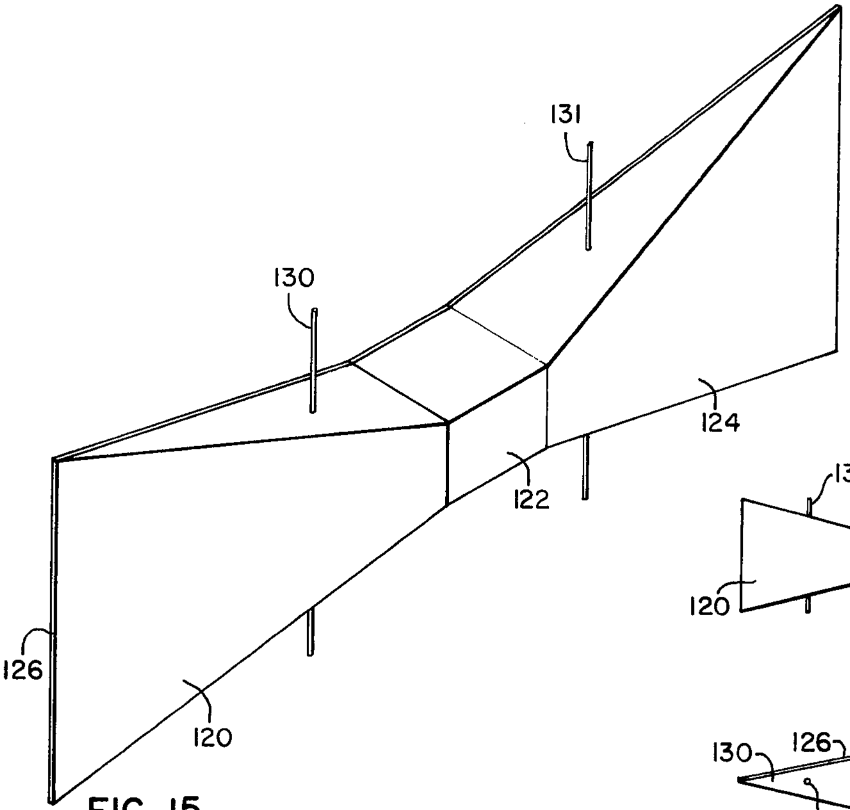
FIGS. 15, 16 and 17 illustrate another embodiment of the present invention, FIG. 15 being an isometric view, 16 an elevational view and 17 a plan view.
Figure 16:
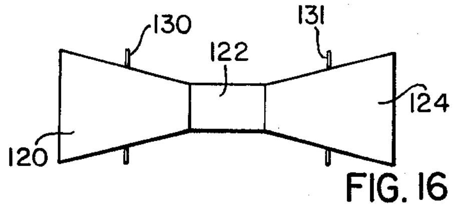
Figure 17:
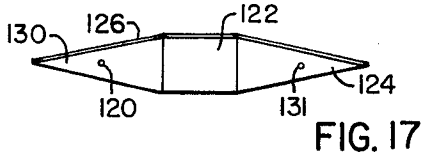

In the embodiments thus far described, the masses used in the construction of the hydrophone were individual and discrete masses. The hydrophone could also be constructed in distributed mass form as illustrated in FIGS. 15, 16 and 17, FIG. 15 illustrating an isometric view, FIG. 16 an elevational view and FIG. 17 a plan view of an alternate embodiment.

The arrangement includes a first mass section or portion 120 which tapers into a second mass portion 122 and further includes a third mass portion 124 similar to portion 120. As seen in FIGS. 16 and 17, mass portions 120 and 124 taper down to the intermediate mass portion 122 (FIG. 16) while simultaneously tapering out to joint with the thicker section. Thus, portions 120 and 124 may be of lower actual mass than portion 122 but would be of higher added mass. A piezoelectric member 126 may be affixed to one side of the structure and if the masses are of a material which is electively conducting, one electrical lead may be connected to the piezoelectric material 126 while the other electric lead may be connected to the conducting structure. Support rods or wires 130 and 131 are attached to the unit at nodal points and are in turn connected to the housing structure (not shown). Operation of the device of FIG. 15 is similar to that of the device of FIG. 4 in that the acceleration of the outer mass portions 120 and 124 is different than the acceleration of the inner mass portion 122 in response to an acoustic signal.

Figure 18:
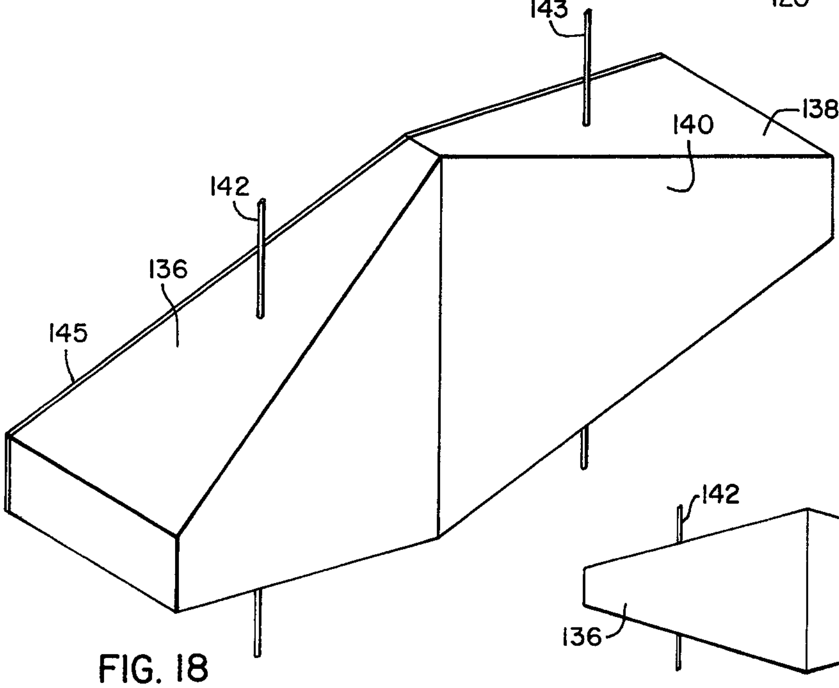
FIGS. 18, 19 and 20 illustrate another embodiment of the present invention, FIG. 18 being an isometric view, 19 an elevational view and 20 a plan view.
Figure 19:
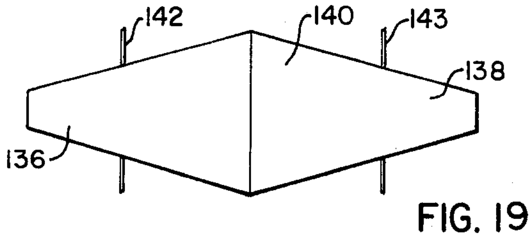
Figure 20:
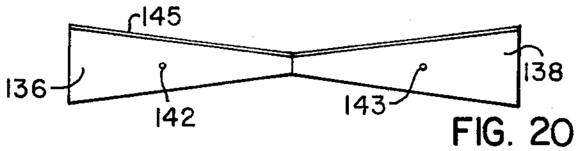

FIGS. 18, 19 and 20 are isometric, elevation and plan views of an alternate arrangement wherein the outer mass portions 136 and 138 have a relatively high actual mass and relatively low added mass wherein the central mass portion 140 has a relatively low actual mass and a relatively high added mass, as was described with respect to FIG. 9.

The structure is operably connected to a housing member by means of supports 142 and 143 connected at nodal points, and piezoelectric material 145 is disposed on one surface of the unit to provide an electrical output signal.

I claim:

1. An inertia balanced hydrophone for detection of acoustic signals in an underwater environment comprising:
(A) a piezoelectric bender unit having at least one bender node;
(B) means for supporting said bender unit at said node,
(C) electrical leads connected to said bender unit to provide an output signal;
(D) at least first and second masses affixed to said bender unit at spaced apart locations with said node between them;
(E) said first and second masses being of respective sizes, masses and shapes that the acceleration of said masses are different in response to the same acoustic signal but are the same in response to physical movement of said support means whereby the output signal due to support motion is substantially zero.

2. Apparatus according to claim 1 wherein:
(A) said bender unit is an elongated piezoelectric bender bar having first and second nodes.

3. Apparatus according to claim 2 which includes:
(A) a third mass affixed to said bender bar;
(B) said second mass being positioned intermediate said first and third masses with said first node being located between said first and second masses and said second node being located between said second and third masses; and
(C) said third mass having the same acceleration response to said acoustic signal as said first mass.

4. Apparatus according to claim 2 wherein:
(A) said means for supporting includes flexible wires connected to said first and second nodes.

5. Apparatus according to claim 3 wherein:
(A) said electrical leads are connected to said first and second nodes on opposite sides of said bender bar to serve as said support means.

6. Apparatus according to claim 1 wherein:

(A) at least one of said masses is of a positively buoyant material.

7. Apparatus according to claim 6 wherein:

(A) the components of said hydrophone are of a weight chosen such that said positively buoyant material imparts neutral buoyancy to said hydrophone.

8. Apparatus according to claim 1 wherein:

(A) said first mass is in two sections, one on either side of said bender unit.

9. Apparatus according to claim 8 wherein:

(A) said second mass is in two sections, one on either side of said bender unit.

10. Apparatus according to claim 3 wherein:

(A) each of said masses is in two sections, one on either side of said bender bar.

11. Apparatus according to claim 1 wherein:

(A) said bender unit includes a backing member.

12. Apparatus according to claim 11 wherein:

(A) said backing member is of electrically conducting material and serves as one electrode of said piezoelectric.

13. Apparatus according to claim 3 wherein:

(A) said masses are distributed along the length of said bender bar as a single unit.

14. Apparatus according to claim 1 wherein:

(A) said bender unit is a piezoelectric bender disk having a nodal circle.

15. Apparatus according to claim 14 wherein:

(A) said first mass is an annular ring around the outer portion of said bender disk; and (B) said second mass is positioned at the center of said bender disk with said nodal circle being located between said second mass and said annular ring.

16. Apparatus according to claim 15 wherein:

(A) said annular ring is in two sections, one on either side of said bender disk.

17. Apparatus according to claim 16 wherein:

(A) said second mass is in two sections, one on either side of said bender disk.

18. Apparatus according to claim 14 wherein:

(A) said means for supporting includes flexible wires connected to said nodal circle on opposite sides of said bender disk.

19. Apparatus according to claim 18 wherein:

(A) said flexible wires are said electrical leads.

20. Apparatus according to claim 15 which includes:

(A) a plurality of support arms;

(B) a plurality of support members bridging the gap between said annular ring and said second mass; and (C) means for adjustably connecting said support arms to respective ones of said support members in the vicinity of said nodal circle.

* * * * *